United States Patent
Cheng et al.

(10) Patent No.: US 11,228,460 B2
(45) Date of Patent: Jan. 18, 2022

(54) ETHERNET CONNECTIVITY USING LAYER 2 TO LAYER 3 MULTIPLEXING

(71) Applicant: T-Mobile USA, Inc., Bellevue, WA (US)

(72) Inventors: Hailei Henry Cheng, Chicago, IL (US); Ryan Hollinger, Kirkland, WA (US); Thomas Aquinas Bresee, Frisco, TX (US)

(73) Assignee: T-Mobile USA, Inc., Bellevue, WA (US)

( * ) Notice: Subject to any disclaimer, the term of this patent is extended or adjusted under 35 U.S.C. 154(b) by 117 days.

(21) Appl. No.: 16/713,669

(22) Filed: Dec. 13, 2019

(65) Prior Publication Data
US 2021/0184893 A1 Jun. 17, 2021

(51) Int. Cl.
*H04L 29/08* (2006.01)
*G06F 8/65* (2018.01)
*H04L 12/46* (2006.01)
*H04L 12/24* (2006.01)
*H04L 29/12* (2006.01)

(52) U.S. Cl.
CPC ........ *H04L 12/465* (2013.01); *H04L 41/0806* (2013.01); *H04L 61/2007* (2013.01); *H04L 67/34* (2013.01); *G06F 8/65* (2013.01)

(58) Field of Classification Search
CPC . H04L 63/029; H04L 45/745; H04L 12/4645; H04L 12/4633; H04W 76/026; H04W 72/048
See application file for complete search history.

(56) References Cited

U.S. PATENT DOCUMENTS

| | | | |
|---|---|---|---|
| 2010/0254406 A1 | 10/2010 | Youn et al. | |
| 2014/0219096 A1 | 8/2014 | Rabie et al. | |
| 2016/0323163 A1* | 11/2016 | Abdulnour | H04L 12/66 |
| 2017/0048143 A1 | 2/2017 | Roy et al. | |
| 2017/0048914 A1* | 2/2017 | Zeng | H04W 28/08 |
| 2017/0085529 A1* | 3/2017 | Finkelstein | H04L 63/162 |

OTHER PUBLICATIONS

The Extended European Search Report dated Apr. 15, 2021 for European Patent Application No. 20209967.7, 10 pages.

* cited by examiner

*Primary Examiner* — Iqbal Zaidi
(74) *Attorney, Agent, or Firm* — Lee & Hayes, P.C.

(57) ABSTRACT

A provisioning method and apparatus provided herein are directed to provisioning of customer equipment (CEs) remotely located at different customer sites via Ethernet. By assigning a CE IP address to a CE where the CE IP address is associated with a plurality of virtual local area network (VLAN) tags and assigning an aggregation equipment (AE) IP address to an AE, first communication between the CE and the AE may be established using the CE IP address and the AE IP address, a VLAN tag from the plurality of VLAN tags at the CE based on information received from the AE may automatically be selected, and second communication between the CE and the AE may be established using the selected VLAN tag.

14 Claims, 8 Drawing Sheets

| Service Type | Port-based (All to one bundling) | VLAN-based (EVC identified by VLAN ID) |
|---|---|---|
| E-Line (Point-to-point EVC) 102 | Ethernet Private Line (EPL) | Ethernet Virtual Private Line (EVPL) |
| E-LAN (Multipoint-to-multipoint EVC) 104 | Ethernet Private LAN (EP-LAN) | Ethernet Virtual Private LAN (EVP-LAN) |
| E-Tree (Rooted-to-multipoint EVC) 106 | Ethernet Private Tree (EP-Tree) | Ethernet Virtual Private Tree (EVP-Tree) |

ETHERNET CONNECTIVITY USING LAYER 2 TO LAYER 3 MULTIPLEXING

BACKGROUND

Ethernet Virtual Connections (or circuits) (EVCs) define a Layer 2 bridging architecture that supports Ethernet services. An EVC is defined by the Metro-Ethernet Forum (MEF) as an "association between two or more user network interfaces that identifies a point-to-point or multipoint-to-multipoint path within the service provider network." An EVC is a conceptual service pipe within the service provider network and a bridge domain is a local broadcast domain that exists separately from virtual local area networks (VLANs).

The MEF also defines a User-to-Network Interface (UNI). The UNI is a standard Ethernet interface that is the point of demarcation between the customer equipment and the service provider's metro Ethernet network. The EVC is defined by the MEF as "an association of two or more UNIs." In other words, the EVC is a logical tunnel that connects two (P2P) or more (MP2MP) sites, enabling the transfer of Ethernet frames between them. The EVC also acts as a separation between the different customers and provides data privacy and security.

Wireless service providers, or Mobile Network Operators (MNOs), generally lease an EVC from Metro Ethernet Carriers between a cell site and a Mobile switch office, such as Comcast, which the Ethernet network considers a trusted packet network, a.k.a. alternative access vendor (AAV) backhaul. The backhaul serves as the transport for cellular traffic from cell site to a core network.

Ethernet has its origins in providing Local Area Network (LAN) connectivity and was not originally used to provide wide area services. Metro Ethernet Carriers have started using this Ethernet "connectivity" to provide Ethernet Services between two or more subscriber locations over EVC. The IEEE 802.3 defines the Ethernet protocol. Service multiplexing is used to support multiple instances of EVCs on the same physical handoff connection, which allows the same customer to have different services with the same Ethernet wire.

The IEEE 802.1Q standard (often referred to as 'Dot1q'), is the networking standard that supports VLANs on an IEEE 802.3 Ethernet network. This standard defines a system of VLAN tagging to Ethernet frames and defines up to 4,094 VLANs. The Ethernet carriers thus provision designated EVCs with unique VLAN tags on the UNI. To match the EVC VLAN tag and to create Layer 2 (L2) switching that allows packets to be switched based on Media Access Control (MAC) address, the subscriber has to configure the VLAN on Customer Equipment (CE) devices, which may be switches or routers. Typically, the two CE devices are located at physically different sites, thus the L2 switching occurs across the EVC service.

To allow traffic between the sites across the EVC, the CEs need to be provisioned with designated VLANs matching the carriers' VLAN on the UNI device. That is, a physical port of the CE needs to be designated to connect to the carrier's UNI, and a customized configuration on the CE allows the carrier's router/switch to learn the MAC in the network to identify which port to send the traffic. A Layer 3 (L3) address can be assigned to the CE device associated with the designated ports to allow the traffic between the sites over the EVC. However, the provisioning of the CEs may be carried out manually at the sites where the CE are located.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 1 shows a table illustrating Ethernet Virtual Connection (EVC) service types defined by the Metro Ethernet Forum (MEF).

DETAILED DESCRIPTION

A provisioning method and apparatus discussed herein are directed to a customer equipment (CE) remotely located at a customer site, and more specifically to provisioning of CEs located at different sites by initially establishing Layer 3 communication then establishing Layer 2 communication by multiplexing virtual local area network (VLAN) identities of the CEs at the Ethernet port.

FIG. 1 shows a table 100 illustrating Ethernet Virtual Connection (EVC) service types defined by the Metro Ethernet Forum (MEF). Each service type, E-Line 102, E-LAN 104, and E-Tree 106, is further described respectively in the following FIGS. 2, 3, and 4.

Figure 2:
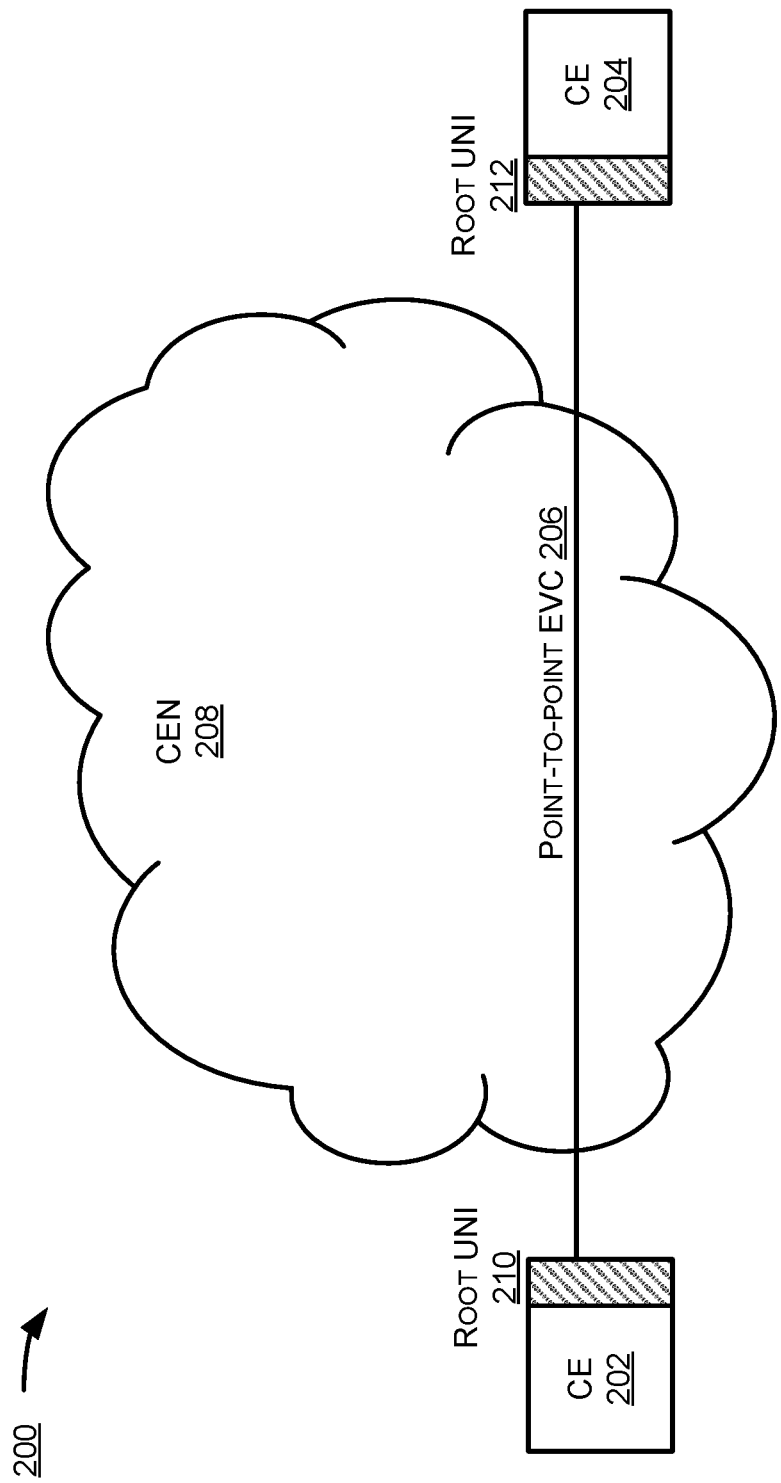
FIG. 2 illustrates a block diagram implementation of an example E-Line, point-to-point EVC of FIG. 1.

FIG. 2 illustrates a block diagram implementation 200 of an example E-Line service 102, point-to-point EVC. As illustrated, CE 202 and CE 204 are connected over a point-to-point EVC 206 established in a carrier Ethernet network (CEN) 208 via their own UNIs, a root UNI 210 and a root UNI 212, respectively. The point-to-point EVC 206 provides a dedicated connectivity between two sites, or two CEs 202 and 204, which may be located at two different sites.

Figure 3:
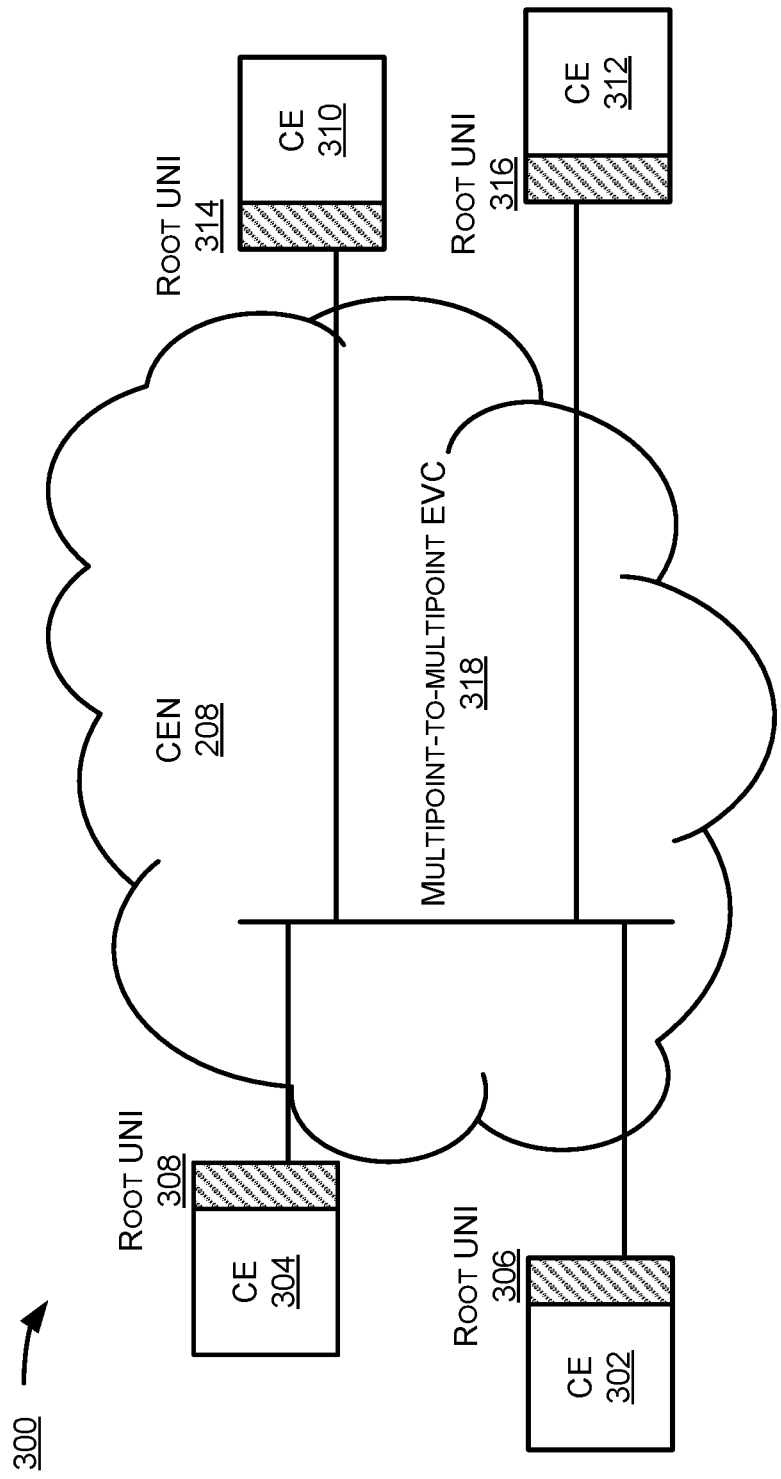
FIG. 3 illustrates a block diagram implementation of an example E-LAN, multipoint-to-multipoint EVC of FIG. 1.

FIG. 3 illustrates a block diagram implementation 300 of an example E-LAN service 104, multipoint-to-multipoint EVC of FIG. 1. As illustrated, an E-LAN service may be utilized to interconnect multiple customer, or subscriber, sites. For example, multiple CEs, such as CE 302 and CE 304 having root UNI 306 and root UNI 308, respectively, may be connected to multiple CEs, such as CE 310 and CE 312 having root UNI 314 and root UNI 316, respectively, over a multipoint-to-multipoint EVC 318 established in the CEN 208.

Figure 4:
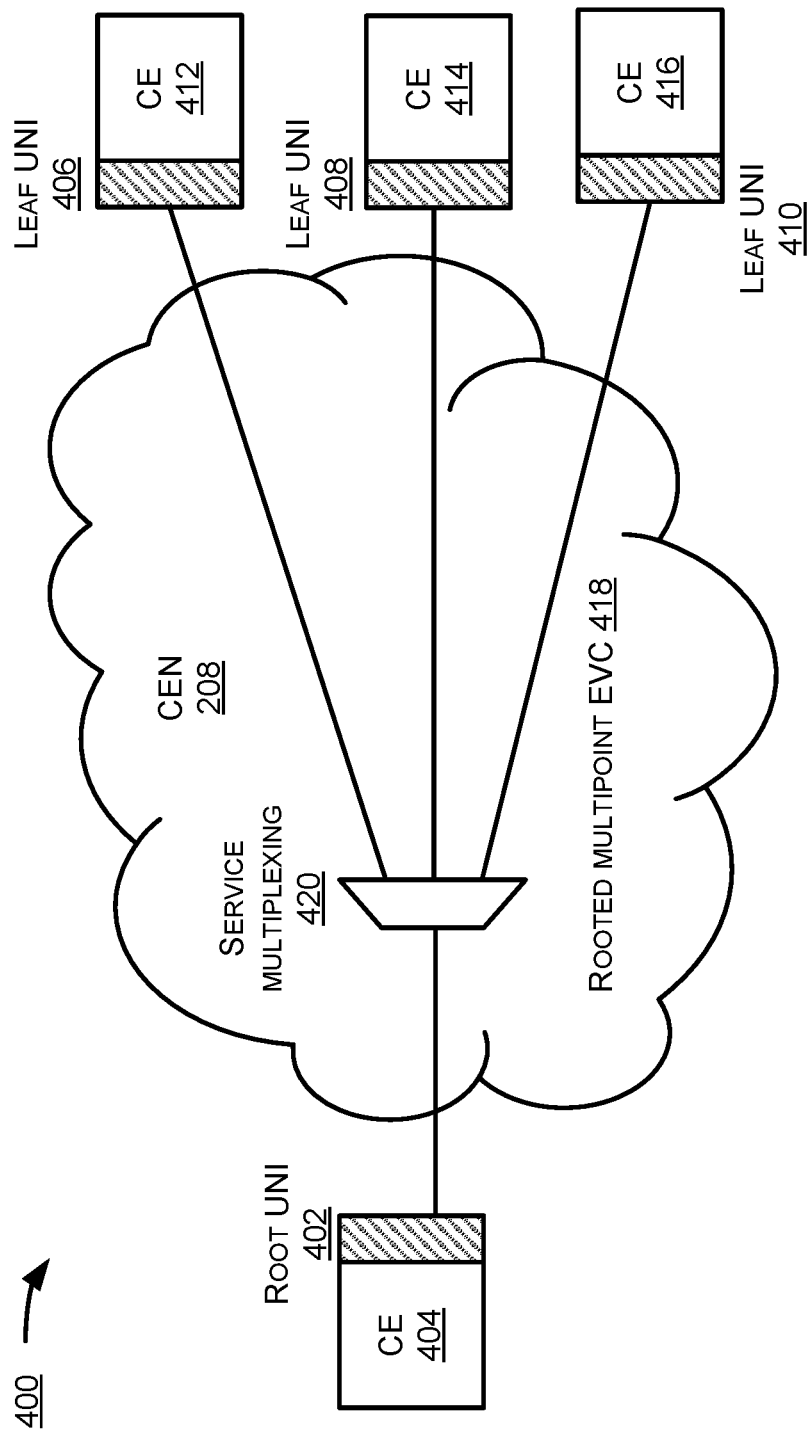
FIG. 4 illustrates a block diagram implementation of an example E-Tree, rooted-multipoint EVC of FIG. 1.

FIG. 4 illustrates a block diagram implementation 400 of an example E-Tree service 106, rooted-multipoint EVC of FIG. 1. As illustrated, an E-Tree service may provide a single Root UNI, such as a Root UNI 402 of a CE 404, connecting to multiple UNIs (leaf UNIs), such as leaf UNIs 406, 408, and 410 of CEs 412, 414, and 416, respectively, over the rooted multipoint EVC 418 established in the CEN 208. Service multiplexing 420 may occur only at the root UNI 402, and each leaf UNI 406, 408, or 410, may exchange data with the root UNI 402 but not with each other.

Figure 5:
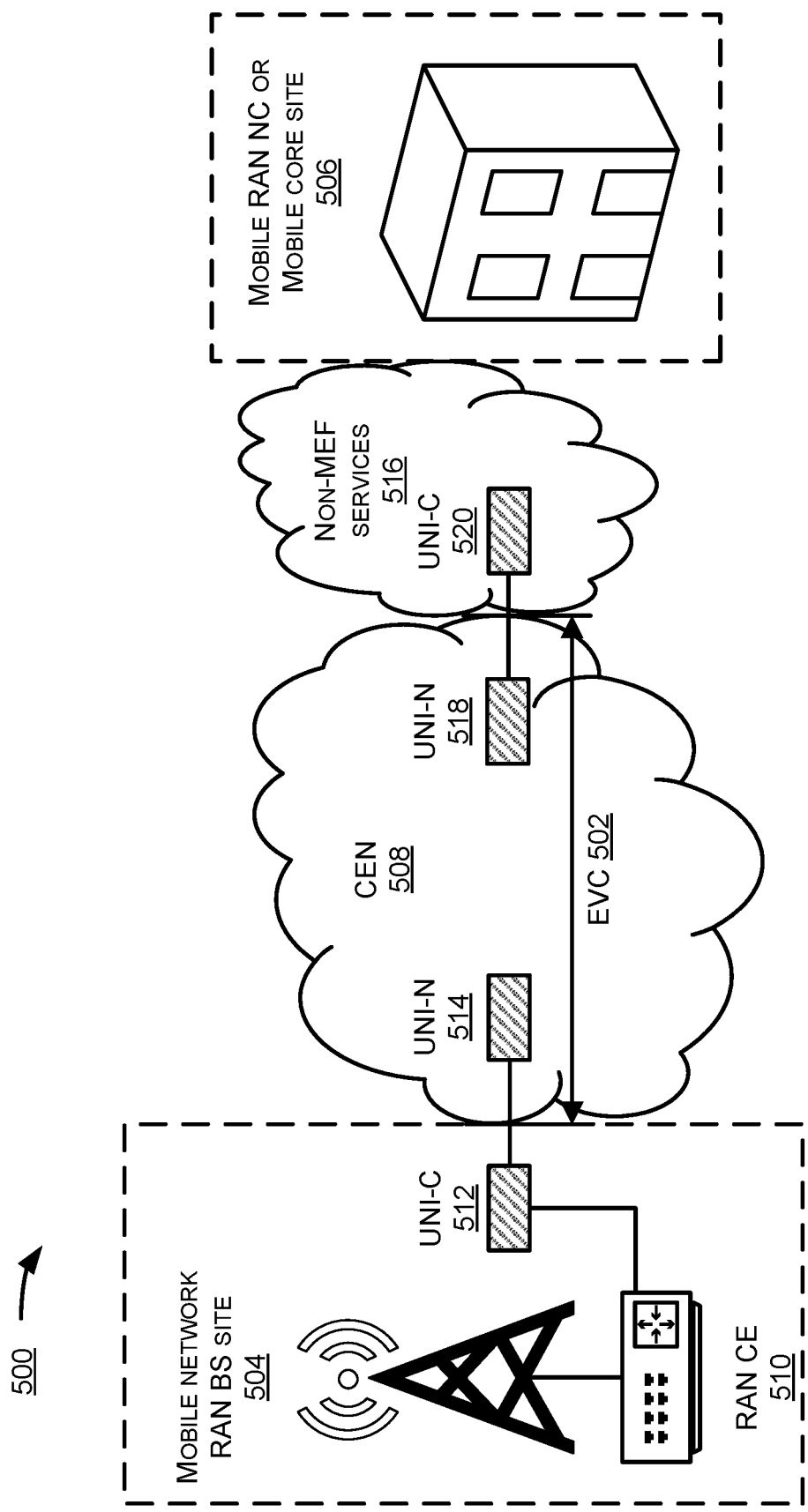
FIG. 5 illustrates a block diagram of an example environment of a mobile operator providing services utilizing an EVC with a mobile network radio access network (RAN) base station (BS) site and a mobile network RAN network controller (NC) or mobile core site.

FIG. 5 illustrates a block diagram 500 of an example environment of a mobile operator providing services utilizing an EVC 502 with a mobile network radio access network (RAN) base station (BS) site 504 and a mobile network RAN network controller (NC) or mobile core site 506.

As described above, a wireless service provider, such as the mobile operator 502, may establish an EVC, such as the EVC 504, in a CEN 508 via UNIs. The mobile operator 502 may lease the EVC 504 from Metro Ethernet Carriers, which the Ethernet network considers trusted packet network, a.k.a. alternative access vendor (AAV) backhaul. The mobile network RAN BS site 504 may include a RAN CE 510 and a UNI—C 512, which interfaces with a UNI—N 514 of the EVC 502 in the CEN 508. The CEN 508 also connects to a non-MEF service 516, which may provide IP services to the Mobile RAN NC 506, via a UNI—N 518 of the EVC 502 in the CEN 508 and a UNI—C 520 of the non-MEF service 516.

Figure 6:
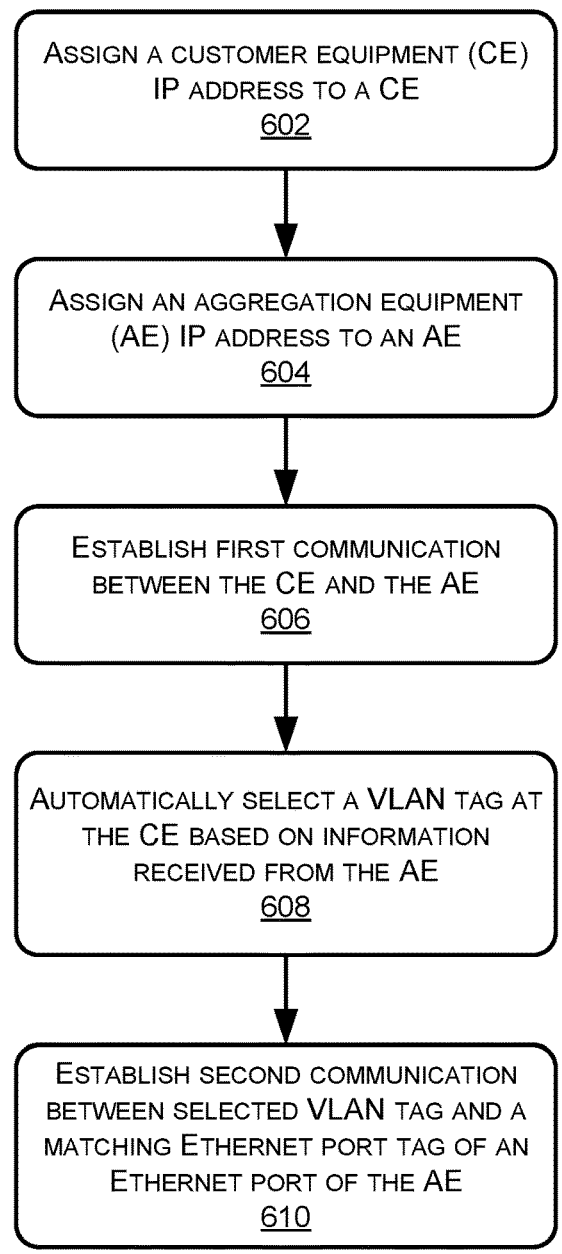
FIG. 6 illustrates an example process for establishing an IP layer connectivity without knowing the Carrier EVC UNI's VLAN in advance.

To successfully connect to CEs and allow traffic between the sites across the EVC, the CEs need to be provisioned with designated VLANs matching the carrier VLAN on the UNI device. However, the carrier EVC UNI's VLAN is not known at the time of the installation of the CEs. FIG. 6 illustrates an example process 600 for establishing an IP layer connectivity without knowing the Carrier EVC UNI's VLAN in advance.

At block 602, a customer equipment (CE) IP address may be assigned to a CE where the CE IP address is associated with a plurality of tags. The CE may be a customer premises equipment (CPE), which may be located remotely from other CEs and CPEs. The plurality of tags may be pre-defined, such as VLAN tags as defined by the 802.1Q standard numerically defining VLAN tags 0 through 4095, where 0 and 4095 are reserved by the system. This mechanism may allow establishing media access control (MAC) learning with any VLAN tags ranging from 2 to 4094 on a given port defined in the IEEE 802.1Q. At block 604, an aggregation equipment (AE) IP address may be assigned to an AE, and more specifically to an interface associated with an Ethernet port tag of an Ethernet port of the AE.

By using the CE IP address and the AE IP address, first communication between the CE and the AE, an end-to-end connectivity, may be established at block 606. The first communication may be a Layer 3 communication established over the Ethernet including Ethernet virtual connection (EVC). At block 608, a tag from the plurality of tags, such a VLAN tag, may be automatically selected at the CE based on information received from the AE over the Ethernet. This automatic selection may be accomplished by a Layer 2 multiplexing to generic Layer 3 interface. The selected VLAN tag at the CE matches the Ethernet port tag of the Ethernet port of the AE, and at block 610, second communication between the CE and the AE may be established using the selected tag, that is, the selected VLAN tag that matches the Ethernet port tag of the AE. At block 612, the CE may be provisioned or updated through the selected tag. By implementing the Layer 2 multiplexing mechanism, a generic Layer 3 IP interface on the remote device's given Ethernet port, that is the UNI of the Ethernet port of the CE or CPE, may then be allowed to connect to any EVC services, and CE at the customer site may be provisioned or updated without knowing the VLAN tag in advance.

Figure 7:
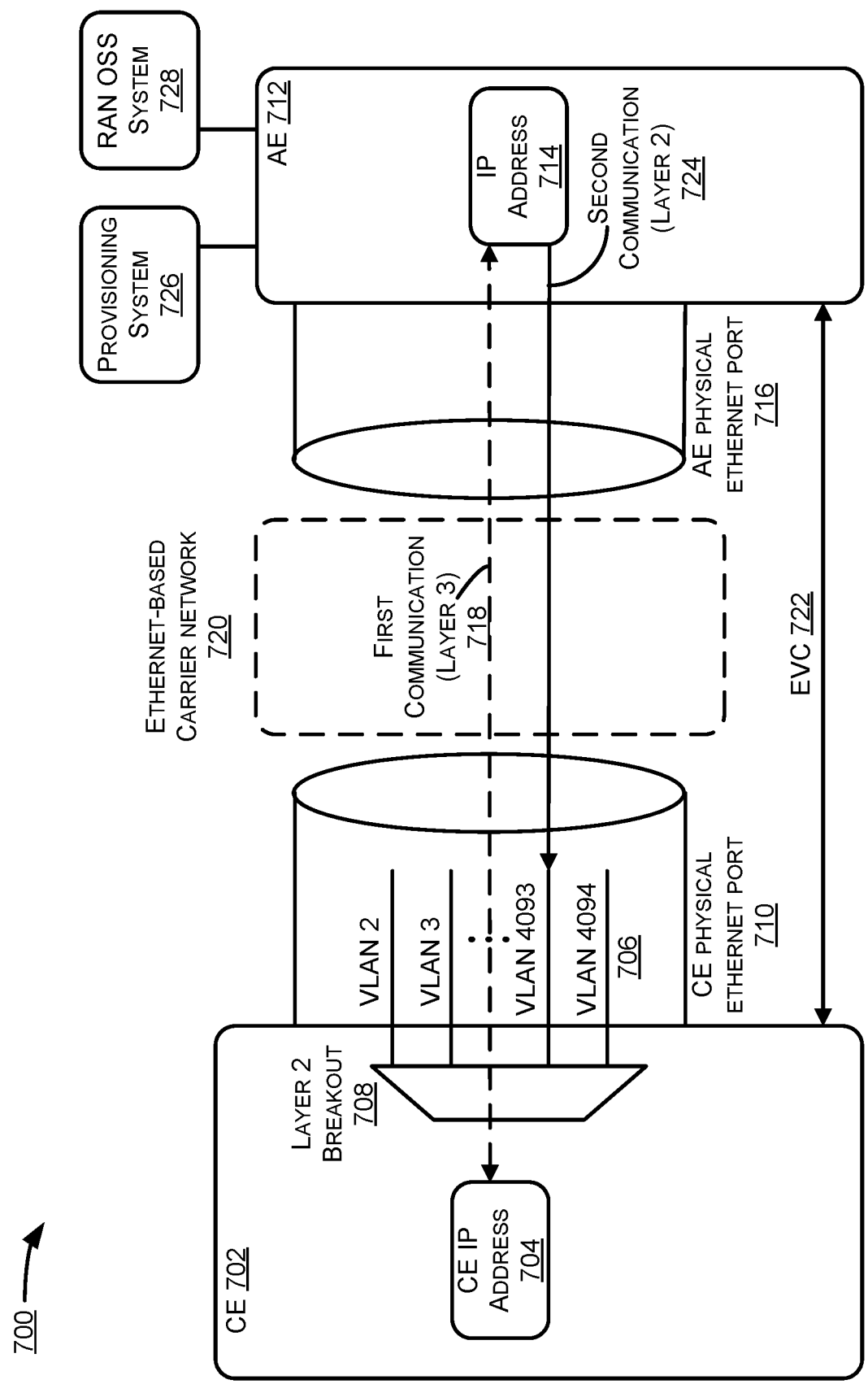
FIG. 7 illustrates a block diagram of an example environment where the process of FIG. 6 has been implemented.

FIG. 7 illustrates a block diagram 700 of an example implementation of the process of FIG. 6.

A CE 702 may include an assigned CE IP address 704 corresponding to a CE UNI (not shown) where the CE IP addresses 704 is associated with a plurality of VLAN tags 706, as defined by the 802.1Q standard, of the multiplexing, or Layer 2 breakout, 708 available in the CE physical Ethernet port 710. The CE 702 may be a CPE, such as a remote edge node. This mechanism may allow establishing MAC learning with any VLAN tags on a given port defined in the IEEE 802.1Q. An AE 712, which may be an HQ aggregation device, may include an AE IP address 714 assigned to an interface (no shown) associated with an Ethernet port tag of an AE physical Ethernet port 716.

First communication 718 between the CE 702 and the AE 712, an end-to-end connectivity, using the CE IP address 704 and the AE IP address 714 may be established where the first communication may be a Layer 3 communication established over the Ethernet-based carrier network 720 including Ethernet virtual connection (EVC) 722. A VLAN tag, automatically selected at the CE 702 based on information received from the AE 712 over the first communication 718 matches the Ethernet port tag of the AE physical Ethernet port 716, and second communication 724 in Layer 2 between the CE 702 and the AE 712 may be established using the selected VLAN tag, that is, the selected VLAN tag (VLAN 4094) matches the AE physical Ethernet port 716. The AE 712 may also be connected to a provisioning system 726 and a RAN OSS system 728. The CE 702 may now be provisioned or updated through the VLAN 4094. By implementing the Layer 2 multiplexing mechanism, a generic Layer 3 IP interface on the remote device's given Ethernet port, that is the UNI of the Ethernet port of the CE or CPE, may then be allowed to connect to any EVC services, and CE at the customer site may be provisioned or updated without knowing the VLAN tag in advance.

Figure 8:
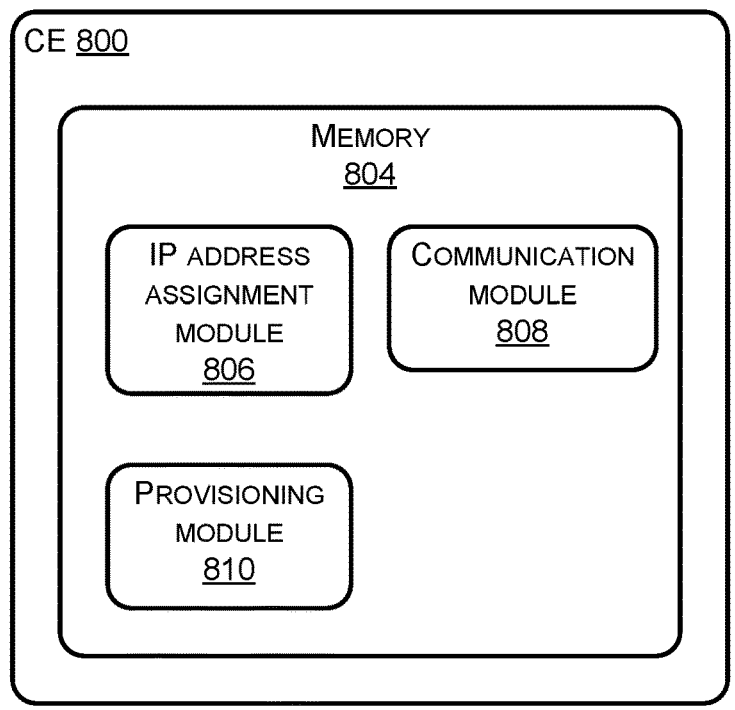
FIG. 8 illustrates an example block diagram of a CE.

FIG. 8 illustrates an example block diagram of a CE 800.

The CE 800 may comprise one or more processors (processors) 802 and memory 804 communicatively coupled to the processors 802. The memory 804 may store computer-executable modules that, when executed by the one or more processors 802, perform associated operations. The computer-executable modules may include an IP address assignment module 806 configured to assign a CE IP address to the CE where the CE IP address associated with a plurality of tags, such as pre-defined virtual local area network (VLAN) tags 706 defined by the IEEE 802.1Q as discussed above with regard to FIG. 7, allowing establishment of media access control (MAC) learning. The computer-executable modules may also include a communication module 808 configured to establish first communication between the CE 800 and an aggregation equipment (AE), such as the AE 712 (not shown), using the CE IP address and an AE IP address assigned to the AE. The first communication may be an end-to-end connectivity and a Layer 3 communication established over the Ethernet, such as the Ethernet-based carrier network 720 including EVC 722 as described above with regard to FIG. 7. The IP address assignment module 806 may further be configured to automatically select a VLAN tag from the plurality of tags of at the CE 800, such as the Layer 2 breakout 708 based on information received from the AE. The communication module 808 may further be configured to establishing second communication between the CE and the AE in Layer 2 using the selected VLAN tag, that is, the selected VLAN tag matches an Ethernet port tag of an Ethernet port, such as the AE physical ethernet port 716. The computer-executable modules may additionally include a provisioning module 810 configured to, via the selected VLAN tag, provision the CE 800 and update a software in the CE 800.

Some or all operations of the methods described above can be performed by execution of computer-readable instructions stored on a computer-readable storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

The computer-readable storage media may include volatile memory (such as random-access memory (RAM)) and/or non-volatile memory (such as read-only memory (ROM), flash memory, etc.). The computer-readable storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer-readable storage medium is an example of computer-readable media. Computer-readable media includes at least two types of computer-readable media, namely computer-readable storage media and communications media. Computer-readable storage media includes volatile and non-volatile, removable and non-removable media implemented in any process or technology for storage of information such as computer-readable instructions, data structures, program modules, or other data. Computer-readable storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer-readable storage media do not include communication media.

The computer-readable instructions stored on one or more non-transitory computer-readable storage media that, when executed by one or more processors, may perform operations described above with reference to FIGS. 6-8. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Example Clauses

A. A method comprising: assigning a customer equipment (CE) IP address to a CE, the CE IP address associated with a plurality of tags; assigning an aggregation equipment (AE) IP address to an AE; establishing first communication between the CE and the AE using the CE IP address and the AE IP address; automatically selecting a tag from the plurality of tags at the CE based on information received from the AE; and establishing second communication between the CE and the AE using the selected tag.

B. The method as paragraph A recites, wherein each tag of the plurality of tags is a pre-defined virtual local area network (VLAN) tag.

C. The method as paragraph B recites, wherein the pre-defined VLAN tag allows establishment of media access control (MAC) learning.

D. The method as paragraph B recites, wherein establishing the first communication between the CE and the AE using the CE IP address and the AE IP address includes establishing communication over Ethernet.

E. The method as paragraph D recites, wherein establishing the communication over the Ethernet includes establishing communication over Ethernet virtual connection (EVC).

F. The method as paragraph E recites, wherein the tag at the CE matches an Ethernet port tag of an Ethernet port of the AE.

G. The method as paragraph A recites, further comprising at least one of: provisioning the CE via the tag or updating a software in the CE via the tag.

H. A customer equipment (CE) comprising: one or more processors; memory communicatively coupled to the one or more processors, the memory storing computer-executable modules that, when executed by the one or more processors, perform associated operations, the computer-executable modules including: an IP address assignment module configured to assign a CE IP address to the CE, the CE IP address associated with a plurality of tags; and a communication module configured to establish first communication between the CE and an aggregation equipment (AE) using the CE IP address and an AE IP address assigned to the AE; wherein: the IP address assignment module is further configured to automatically select a tag from the plurality of tags at the CE based on information received from the AE, and the communication module is further configured to establishing second communication between the CE and the AE using the selected tag.

I. The CE as paragraph H recites, wherein: each tag of the plurality of tags is a pre-defined virtual local area network (VLAN) tag, and the pre-defined VLAN tag allows establishment of media access control (MAC) learning.

J. The CE as paragraph I recites, wherein establishing the first communication between the CE and the AE using the CE IP address and the AE IP address includes establishing communication over Ethernet.

K. The CE as paragraph J recites, wherein establishing the communication over the Ethernet includes establishing communication over Ethernet virtual connection (EVC).

L. The CE as paragraph K recites, wherein the tag at the CE matches an Ethernet port tag of an Ethernet port of the AE.

M. The CE as paragraph I recites, wherein the modules further comprise: a provisioning module configured to at least one of: provision the CE via the tag or update a software in the CE via the tag.

N. A computer-readable storage medium storing computer-readable instructions executable by one or more processors, that when executed by the one or more processors, cause the one or more processors to perform operations comprising: assigning a customer equipment (CE) IP address to a CE, the CE IP address associated with a plurality of tags; assigning an aggregation equipment (AE)

IP address to an AE; establishing first communication between the CE and the AE using the CE IP address and the AE IP address; automatically selecting a tag from the plurality of tags at the CE based on information received from the AE; and establishing second communication between the CE and the AE using the selected tag.

O. The computer-readable storage medium as paragraph N recites, wherein each tag of the plurality of tags is a pre-defined virtual local area network (VLAN) tag.

P. The computer-readable storage medium as paragraph O recites, wherein the pre-defined VLAN tag allows establishment of media access control (MAC) learning.

Q. The computer-readable storage medium as paragraph O recites, wherein establishing the first communication between the CE and the AE using the CE IP address and the AE IP address includes establishing communication over Ethernet.

R. The computer-readable storage medium as paragraph Q recites, wherein establishing the communication over the Ethernet includes establishing communication over Ethernet virtual connection (EVC).

S. The computer-readable storage medium as paragraph R recites, wherein the tag at the CE matches an Ethernet port tag of an Ethernet port of the AE.

T. The computer-readable storage medium as paragraph N recites, wherein the operations further comprise at least one of: provisioning the CE via the tag or updating a software in the CE via the tag.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
assigning a customer equipment (CE) IP address to a CE, the CE IP address associated with a plurality of tags;
assigning an aggregation equipment (AE) IP address to an AE;
establishing first communication between the CE and the AE using the CE IP address and the AE IP address, wherein establishing the first communication between the CE and the AE using the CE IP address and the AE IP address includes establishing communication over Ethernet virtual connection (EVC);
automatically selecting a tag from the plurality of tags at the CE based on information received from the AE, wherein the selected tag at the CE matches an Ethernet port tag of an Ethernet port of the AE; and
establishing second communication between the CE and the AE using the selected tag.

2. The method of claim 1, wherein each tag of the plurality of tags is a pre-defined virtual local area network (VLAN) tag.

3. The method of claim 2, wherein the pre-defined VLAN tag allows establishment of media access control (MAC) learning.

4. The method of claim 2, wherein establishing the first communication between the CE and the AE using the CE IP address and the AE IP address includes establishing communication over Ethernet.

5. The method of claim 1, further comprising at least one of:
provisioning the CE via the tag, or
updating a software in the CE via the tag.

6. A customer equipment (CE) comprising:
one or more processors;
memory communicatively coupled to the one or more processors, the memory storing computer-executable modules that, when executed by the one or more processors, perform associated operations, the computer-executable modules including:
an IP address assignment module configured to assign a CE IP address to the CE, the CE IP address associated with a plurality of tags; and
a communication module configured to establish first communication between the CE and an aggregation equipment (AE) using the CE IP address and an AE IP address assigned to the AE;
wherein:
the IP address assignment module is further configured to automatically select a tag from the plurality of tags at the CE based on information received from the AE,
the communication module is further configured to establishing second communication between the CE and the AE using the selected tag,
establishing the first communication between the CE and the AE using the CE IP address and the AE IP address includes establishing communication over Ethernet virtual connection (EVC), and
the selected tag at the CE matches an Ethernet port tag of an Ethernet port of the AE.

7. The CE of claim 6, wherein:
each tag of the plurality of tags is a pre-defined virtual local area network (VLAN) tag, and
the pre-defined VLAN tag allows establishment of media access control (MAC) learning.

8. The CE of claim 7, wherein establishing the first communication between the CE and the AE using the CE IP address and the AE IP address includes establishing communication over Ethernet.

9. The CE of claim 7, wherein the modules further comprise:
a provisioning module configured to at least one of:
provision the CE via the tag, or
update a software in the CE via the tag.

10. A non-transitory computer-readable storage medium storing computer-readable instructions executable by one or more processors, that when executed by the one or more processors, cause the one or more processors to perform operations comprising:
assigning a customer equipment (CE) IP address to a CE, the CE IP address associated with a plurality of tags;
assigning an aggregation equipment (AE) IP address to an AE;
establishing first communication between the CE and the AE using the CE IP address and the AE IP address, wherein establishing the first communication between the CE and the AE using the CE IP address and the AE IP address includes establishing communication over Ethernet virtual connection (EVC);
automatically selecting a tag from the plurality of tags at the CE based on information received from the AE, wherein the selected tag at the CE matches an Ethernet port tag of an Ethernet port of the AE; and
establishing second communication between the CE and the AE using the selected tag.

11. The non-transitory computer-readable storage medium of claim 10, wherein each tag of the plurality of tags is a pre-defined virtual local area network (VLAN) tag.

12. The non-transitory computer-readable storage medium of claim 11, wherein the pre-defined VLAN tag allows establishment of media access control (MAC) learning.

13. The non-transitory computer-readable storage medium of claim 11, wherein establishing the first communication between the CE and the AE using the CE IP address and the AE IP address includes establishing communication over Ethernet.

14. The non-transitory computer-readable storage medium of claim 10, wherein the operations further comprise at least one of:
   provisioning the CE via the tag, or
   updating a software in the CE via the tag.

* * * * *